(12) United States Patent
Liang et al.

(10) Patent No.: US 9,942,305 B2
(45) Date of Patent: Apr. 10, 2018

(54) METHOD AND APPARATUS FOR RESOURCE DOWNLOADING OVER A NETWORK FROM MULTIPLE SOURCES

(71) Applicant: GUANGZHOU UCWEB COMPUTER TECHNOLOGY CO., LTD., Guangzhou (CN)

(72) Inventors: Jie Liang, Guangzhou (CN); Huake Guo, Guangzhou (CN); Xinwu Luo, Guangzhou (CN)

(73) Assignee: GUANGZHOU UCWEB COMPUTER TECHNOLOGY CO., LTD., Guangzhou (CN)

( * ) Notice: Subject to any disclaimer, the term of this patent is extended or adjusted under 35 U.S.C. 154(b) by 297 days.

(21) Appl. No.: 14/965,691

(22) Filed: Dec. 10, 2015

(65) Prior Publication Data

US 2016/0173567 A1 Jun. 16, 2016

(30) Foreign Application Priority Data

Dec. 10, 2014 (CN) .......................... 2014 1 0758072

(51) Int. Cl.
*H04L 29/08* (2006.01)
*H04L 29/14* (2006.01)
(52) U.S. Cl.
CPC .............. *H04L 67/06* (2013.01); *H04L 67/02* (2013.01); *H04L 69/40* (2013.01)

(58) Field of Classification Search
CPC ...................................................... H04L 67/06
See application file for complete search history.

(56) References Cited

U.S. PATENT DOCUMENTS

| | | | |
|---|---|---|---|
| 9,386,117 B2* | 7/2016 | Kasten | G06F 12/0873 |
| 2002/0073047 A1* | 6/2002 | Morrison | G06Q 20/12 |
| | | | 705/71 |
| 2011/0296038 A1* | 12/2011 | Mandre | G06F 17/30899 |
| | | | 709/228 |
| 2015/0066858 A1* | 3/2015 | Sabdar | G06F 17/30088 |
| | | | 707/639 |
| 2016/0173567 A1* | 6/2016 | Liang | H04L 67/06 |
| | | | 709/219 |

* cited by examiner

*Primary Examiner* — Jerry B Dennison

(57) ABSTRACT

A method for file downloading is described. The method comprises: transmitting a first request to a server to start a downloading process of a file; receiving a first destination address and a first cookie for the downloading process, wherein the first destination address and the first cookie are associated with the file; storing the first destination address, the first cookie, a link address associated with the file, and a web address associated with the link address; detecting an interruption of the downloading process; and responsive to detection of an interruption of the downloading process, transmitting a second request to the server for a second destination address and a second cookie associated with the file based on the link address and web address. The method further comprises resuming the downloading process of the file using the second destination address and the second cookie.

20 Claims, 5 Drawing Sheets

220

210

METHOD AND APPARATUS FOR RESOURCE DOWNLOADING OVER A NETWORK FROM MULTIPLE SOURCES

CROSS-REFERENCE TO RELATED APPLICATION

This application is based upon and claims priority to Chinese Patent Application No. 201410758072.2, filed Dec. 10, 2014, the entire contents of which are incorporated herein by reference.

TECHNICAL FIELD

The present disclosure generally relates to the field of computer technology and, more particularly, to a method and an apparatus for resource downloading over a network from multiple sources.

BACKGROUND

Under current technology, resources (e.g., a file) can be downloaded to a mobile device from a computer or a network source via a network, a data line, Bluetooth, etc. The resources can include file data for e-books, music, movies, software, pictures, etc. At present, many website operators use content distribution servers to manage resources available for downloading. When a user clicks a link via a browser to download a file, the content distribution server can generate a destination address of a download source according to the selection of the user, from which the resources can be downloaded to the mobile device.

However, the destination address of the download source (or a cookie that includes other information for the downloading), generated by the content distribution server, is typically valid only for a period of time. The destination address can expire and become invalid after, for example, an hour. As a result, in a case where the downloading process is interrupted or suspended for a certain duration, such that the destination address has expired, the downloading process cannot be completed, or resumed, with the expired destination address. Furthermore, in order to restart the downloading process, the user may be required to search for a currently-valid location of the download source, while discarding the portion of the file that has already been downloaded before the downloading process was interrupted, leading to waste of network resources. Moreover, in a case where a currently-valid location of the download source cannot be found, the user may have to abandon the downloading, lead to poor user experience. The above problems are further exacerbated by factors such as a poor network environment, excessively long download time and/or pause time, etc.

SUMMARY

As discussed above, when a destination address of a download source expires, the downloading can be completed or resumed with the expired destination address. An objective of the present disclosure is to provide a method and an apparatus for resource downloading over a network from different sources, to solve the aforementioned problem.

The present disclosure provides a method for file downloading, the method comprising: transmitting a first request to a server to start a downloading process of a file; receiving a first destination address and a first cookie for the downloading process, wherein the first destination address and the first cookie are associated with the file; storing the first destination address, the first cookie, a link address associated with the file, and a web address associated with the link address; detecting an interruption of the downloading process; responsive to detection of an interruption of the downloading process, transmitting a second request to the server for a second destination address and a second cookie based on the link address and web address, wherein the second destination address and the second cookie are associated with the file; and resuming the downloading process of the file using the second destination address and the second cookie.

In some embodiments, the detection of an interruption of the downloading process further comprises detecting that at least one of the first destination address and the first cookie is invalid.

In some embodiments, the detection of an interruption of the downloading process further comprises detecting that at least one of the first destination address and the first cookie has expired.

In some embodiments, the second request is generated based on the link address, and wherein a header of the second request includes the web address.

In some embodiments, the resumption of the downloading process of the file using the second destination address and the second cookie comprises resuming the downloading process based on a progress of the downloading process before the interruption occurs.

In some embodiments, the resumption of the downloading process of the file using the second destination address and the second cookie comprises transmitting a third request to download the file, wherein the third request includes an attribute that represents a size of the file that has not been downloaded when the interruption of the downloading process occurs.

In some embodiments, the third request is an HTTP (HyperText Transfer Protocol) request, and wherein the attribute is included in the range unit of the third request.

Embodiments of the present disclosure also provides a non-transitory computer readable medium that stores a program that, when executed by a processor, causes the processor to perform the aforementioned method for file downloading.

Embodiments of the present disclosure also provide an apparatus for file downloading. The apparatus includes a memory device that stores instructions and at least one hardware processor. The at least one hardware processor is configured to execute the instructions to transmit a first request to a server to start a downloading process of a file, and receive a first destination address and a first cookie, wherein the first destination address and the first cookie are associated with the file. The at least one hardware processor is also configured to store the first destination address, the first cookie, a link address associated with the file, and a web address associated with the link address, detect an interruption of the downloading process, and responsive to detection of an interruption of the downloading process, transmit a second request to the server for a second destination address and a second cookie based on the link address and web address, wherein the second destination address and the second cookie are associated with the file. The at least one hardware processor is also configured to resume the downloading process of the file using the second destination address and the second cookie.

Using the techniques of the present disclosure, by switching the download source, a new destination address and a new cookie can be generated when there is a network service interruption or a suspension in the downloading process. The downloading process can then be resumed using the new destination address and the new cookie, thereby improving efficiency of network resource usage, and user experience.

Additional objects and advantages of the disclosed embodiments will be set forth in part in the following description, and in part will be apparent from the description, or may be learned by practice of the embodiments. The objects and advantages of the disclosed embodiments may be realized and attained by the elements and combinations set forth in the claims.

It is to be understood that both the foregoing general description and the following detailed description are exemplary and explanatory only and are not restrictive of the disclosed embodiments, as claimed.

DESCRIPTION OF THE EMBODIMENTS

As discussed above, under current technology, when a destination address of a download source expires, the downloading can be completed or resumed with the expired destination address. An objective of the present disclosure is to provide a method and an apparatus for resource downloading over a network from different sources, to solve the aforementioned problem.

Reference will now be made in detail to methods and specific implementations that seek to overcome the foregoing shortcomings of current systems and methods. According to some embodiments of the present disclosure, information for resource downloading, such as a destination address of a download source destination, a cookie, a link address of a file to be downloaded, a web address associated with the resource, etc., can be stored at a client-side terminal (e.g., a mobile device) to which the resource is to be downloaded. Information about a new location for download source can be generated. The downloading process can also be switched to be from the new location. Such an arrangement allows the client-side terminal to continue with the downloading process to completion, thereby improving efficiency of network resource usage, as well as user experience.

Examples of these implementations are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the disclosure. Instead, they are merely examples of apparatuses and methods consistent with aspects related to the disclosure as recited in the appended claims.

Moreover, in the following disclosure, the terms "server" and "content distribution server" can both refer to computer software for managing resources and providing services for users, and are used interchangeably.

Figure 1:
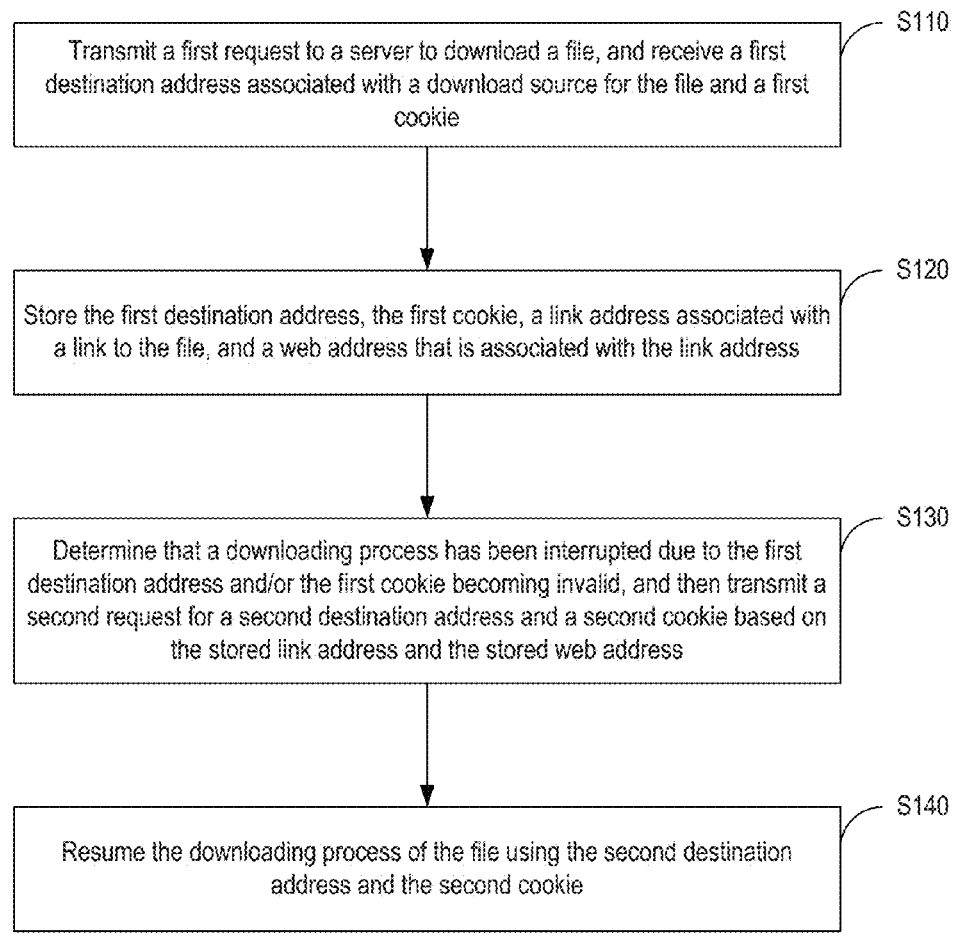
FIG. 1 is a flowchart illustrating a method for file downloading based on switching of a download source, consistent with some embodiments of the present disclosure.

Reference is now made to FIG. 1, which illustrates an exemplary method 100 for file downloading based on switching of a download source, consistent with some embodiments of the present disclosure. The method can be performed at, for example, a client device (e.g., a mobile device). Referring to FIG. 1, method 100 includes the following steps.

In step S110, the client device transmits a first request to a server to start a downloading process of a file, and receive a first destination address associated with a download source for the file and a first cookie. For the rest of the disclosure, "downloading process" refers to the entire transaction process before the client device and the server for the downloading of the file, which can include the client device transmitting request to the server, the server transmitting back information to the client device for the downloading, and the transfer of the data for the file.

In some embodiments, based on the request associated with a link address of a link to the file on a web page, a content distribution server can return, to the client device, a first destination address and a first cookie associated with the target file. For example, when the client device detects that a user clicks a link on a web page to download the file, the client device can transmit a request for the file to the content distribution server. The content distribution server can then generate a first destination address and a first cookie that are valid for a period of time, and return the source destination address and the cookie to the client device.

In step S120, the client device stores the first destination address, the first cookie, the link address associated with the link to the file, and a web address associated with the web page that includes the link.

In some embodiments, as discussed before, when the client device transmits a request to the server to download a file, and receive from the server a first destination address and a first cookie that correspond to the target file. Since the destination address and the cookie may be valid only for a period of time and can expire and become invalid in some circumstances (for example, the Internet is off, or the downloading process was suspended for an excessively long time), the server may return an error when the client device tries to resume the downloading process. Accordingly, according to embodiments of the present disclosure, the client device can store a destination address, a cookie, a link address associated with a link to the file, and a web address that is associated with the link address, to enable the resumption of the downloading process in the aforementioned circumstances.

In some embodiments, the web address is an address of the web page on which a link of the target file is located. The cookie can be generated by the content distribution server and can include data stored on the client device. The data can be stored by a website and can be configured to facilitate user identification and session tracking.

In step S130, when an interruption of the downloading process is detected (e.g., because at least one of the first destination address and the first cookie has expired), the client device can then transmit a second request for a second destination address and a second cookie associated with the target file, based on the stored link address and the stored web address.

In some embodiments, based on information provided by the server (e.g., an error code), the client device can, based on the information, determine that the interruption is due to at least one of the first destination address and the first cookie becoming invalid. According to embodiments of the disclosure, when at least one of the first destination address and the first cookie becomes invalid, the client device can generate a second request, based on the stored link address and the stored web address, to obtain a second destination address and a second cookie associated with the target file. The downloading process can then be resumed using the second destination address and the second cookie.

As an illustrative example, the client device uses a first destination address and a first cookie, previously returned from a content distribution server, to start a downloading process. The downloading process is then paused for a period of time (e.g., one hour) due to, for example, network service interruption or other operations, such that the first destination address and the first cookie have expired. As a result, the downloading process cannot be resumed with the expired first destination address and first cookie. In such a case, the client device can transmit a request to the content distribution server to obtain a second destination address and a second cookie associated with the target file. The client device can then discard the expired first destination address and first cookie, and instead resume the downloading process using the second destination address and the second cookie.

In some embodiments, the transmission of the second request for a second destination address and a second cookie based on the stored link address and the stored web address can include: transmitting a second request based on the stored link address, with the second request including the current web address. To enhance security (e.g., to avoid access to a link from other unauthorized web sites), it is common for a content distribution server to require a request for downloading a file associated with a link address to include the web address in the request header. The content distribution server can then verify the target file of which the downloading is to be resumed, based on the web address and the link address, and then return the destination address and the cookie associated with the target file.

In step S140, the client device resumes the downloading process of the file using the second destination address and the second cookie.

In some embodiments, the client device can switch the downloading process from using the previously-stored first destination address and the first cookie to using the second destination address and the second cookie. The client device can then resume the downloading process with the second destination address and the second cookie.

In some embodiments, the resumption of the downloading process of the file using the second destination address and the second cookie can include transmitting a third request that includes attributes reflecting a size of the file that has not been downloaded. For example, in an HTTP (HyperText Transfer Protocol) request, the range unit can include values that reflect a size of the file that has not been downloaded. As an illustrative example, the downloading of a 1 mega-byte file is interrupted after 512 kilo-bytes of data of the file have been downloaded. In that case, the "bytes" range unit of the subsequent HTTP request to resume the downloading process can include "512-1024."

The content distribution server can generate different destination addresses in response to a request to access a link on a web page, even though those destination addresses are associated with the same target file. As discussed before, the second request for the second destination address includes both the link address and the web address, as required by the content distribution server, to enhance security. Such an arrangement also enables the content distribution server to ascertain the target file being requested, not just based on the destination address (since it can be different), but also based on the link address and the web address. After confirming the target file being requested, and that the link address and the web address is a valid combination (e.g., indicating the link is accessed from an authorized web site), the content distribution server can then generate the second destination address and the second cookie and transmit them to the client device. The client device can then resume the downloading process of the target file.

FIGS. 2A-D are schematic diagrams illustrating exemplary interfaces 200, 210, 220, and 230 for file downloading, consistent with embodiments of the present disclosure. In some embodiments, interfaces 200, 210, 220, and 230 are operable on a client device, which enables the client device to receive an instruction from user and to perform one or more steps of method 100 of FIG. 1 based on the instruction.

Figure 2A:
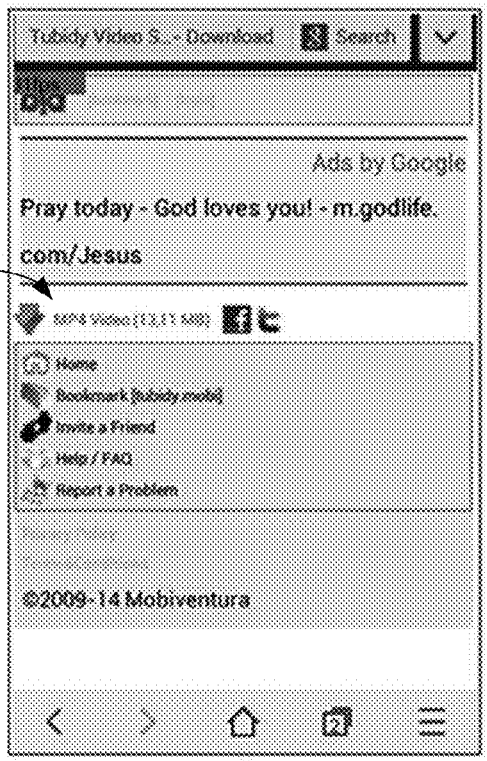
FIGS. 2A-D are schematic diagrams illustrating an interface for file downloading, consistent with some embodiments of the present disclosure.

As shown in FIG. 2A, interface 200 displays a link 202. When a user clicks on the link, the client device can be instructed to download a MP4 video of a size of 13.11 mega-bytes. The downloading process will include the client device performing step S110 of FIG. 1 to transmit a request to content distribution server. The server can then generate a first destination address and a first cookie that correspond to the video file, and transmit the first destination address and the first cookie to the client device. The client device can then perform step S120 of FIG. 1 to store the first destination address and the first cookie. The client device can also store a link address associated with the video file, as well as a web address associated with the link address.

Figure 2B:
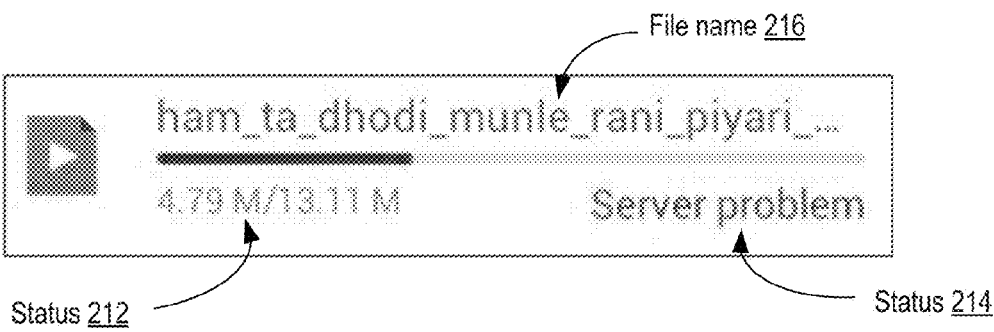

Reference is now made to FIG. 2B. After the client device detects an indication to download the video file (e.g., by detecting a clicking action of link 202 at interface 200), the client device can display an interface 210. Interface 210 includes a status 212, which can indicate a size of the file that has been downloaded, a status 214, which can indicate a status of the transmission, and a file name 216, which can indicate the file name of the file being downloaded. In this illustrative example, the downloading process is interrupted when 4.79 mega-byte of data have been downloaded. After the interruption persists for a certain duration, the first destination address and the first cookie has expired. When the user attempts to resume the downloading process, status 214 can include an error message "server problem," which can signal that the content distribution server no longer accepts the expired first destination address and the expired first cookie.

Figure 2C:
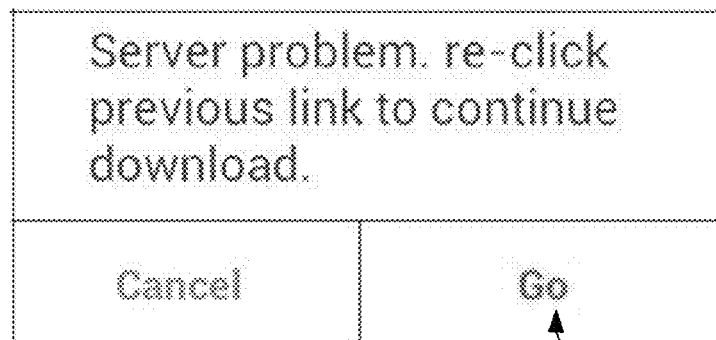

Reference is now made to FIG. 2C. If the client device detects that the user attempts to restart the downloading process using interface 200 of FIG. 2A (e.g., by detecting another clicking action of link 202 at interface 200), the client device can display an interface 220. Interface 220 can include a dialog box that inquires whether the user would like to resume the downloading using the previously link. Upon detecting that the user selects option 222, which indicates that the user would like to resume the downloading using the previously link, the client device can perform step S130 of FIG. 1 to generate a second request based on the stored link address and the stored web address, to obtain a second destination address and a second cookie.

Figure 2D:
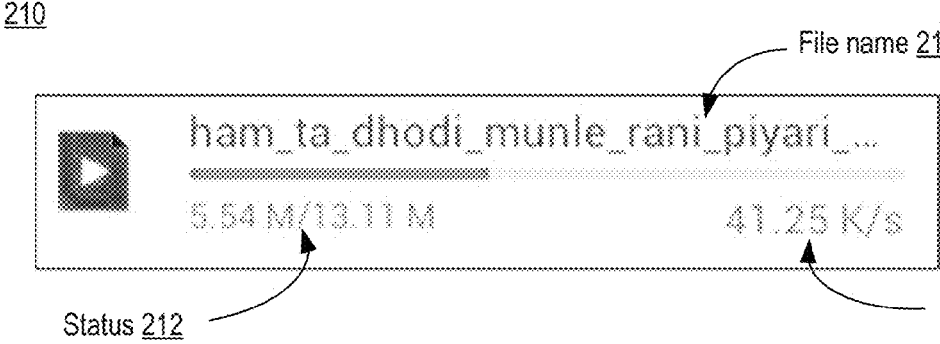

After the client device obtains the second destination address and the second cookie, it can then perform step S140 to resume the downloading process using the second destination address and the second cookie. As shown in FIG. 2D, both statuses 212 and 214 of interface 210 have been updated with respect to FIG. 2B. For example, status 212 indicates that 5.54 mega-bytes of data have been uploaded, and the downloading is resumed from the point of interruption. Also, status 214 indicates a download speed of 41.25 kilo-bytes per second (versus "server problem" as shown in FIG. 2B). Moreover, the same file is being downloaded, as indicated by identical file name 216 being displayed in both FIGS. 2B and 2D.

Using the techniques of the present disclosure, by switching the download source, a new destination address and a new cookie can be generated when there is a network service interruption or a suspension in the downloading process. The downloading process can then be resumed using the new destination address and the new cookie, thereby improving efficiency of network resource usage, and user experience.

Figure 3:
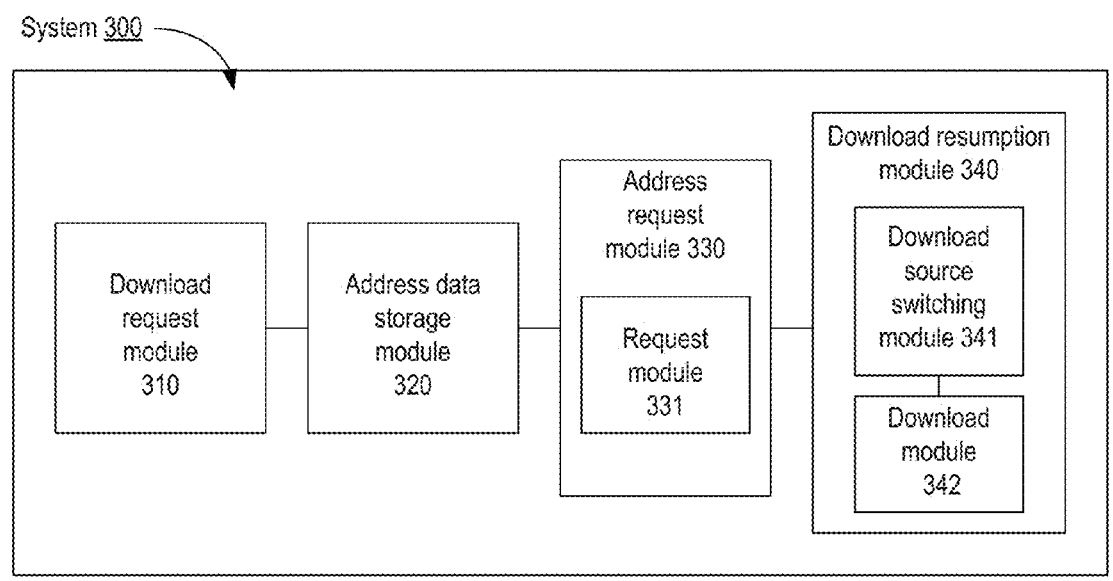
FIG. 3 is a schematic diagram illustrating a system for file downloading based on switching of a download source, consistent with some embodiments of the present disclosure.

FIG. 3 is a schematic diagram illustrating an exemplary system 300 for file downloading based on switching of a download source, consistent with embodiments of the present disclosure. In some embodiments, various components of system 300 can perform one or more steps of method 100 of FIG. 1. As shown in FIG. 6, system 300 includes a download request module 310, an address data storage module 320, an address request unit 330 which includes a request module 331, and a download resumption module 340 which includes download source switching module 341 and download module 342.

In general, the word "module," as used herein, refers to logic embodied in hardware or firmware, or to a collection of software instructions, possibly having entry and exit points, written in a programming language, such as, for example, Java, Lua, C or C++. A software module can be compiled and linked into an executable program, installed in a dynamic link library, or written in an interpreted programming language such as, for example, BASIC, Perl, or Python. It will be appreciated that software modules can be callable from other modules or from themselves, and/or can be invoked in response to detected events or interrupts. Software modules configured for execution on computing devices (e.g., a processor) can be provided on a computer readable medium, such as a compact disc, digital video disc, flash drive, magnetic disc, or any other tangible medium, or as a digital download (and can be originally stored in a compressed or installable format that requires installation, decompression, or decryption prior to execution). Such software code can be stored, partially or fully, on a memory device of the executing computing device, for execution by the computing device. Software instructions can be embedded in firmware, such as an EPROM. It will be further appreciated that hardware modules can be comprised of connected logic units, such as gates and flip-flops, and/or can be comprised of programmable units, such as programmable gate arrays or processors. The modules or computing device functionality described herein are preferably implemented as software modules, but can be represented in hardware or firmware. Generally, the modules described herein refer to logical modules that can be combined with other modules or divided into sub-modules despite their physical organization or storage.

Referring back to FIG. 3, in some embodiments, download request module 310 is configured to transmit a first request to a server to download a file, and receive a first destination address associated with a download source for the file and a first cookie. In some embodiments, download request module 310 is configured to perform at least part of step S110 of method 100 of FIG. 1.

Address data storage module 320 may be configured to store the first destination address, the first cookie, the link address associated with the link to the file, and a web address associated with the web page that includes the link. In some embodiments, address data storage module 320 is configured to perform at least part of step S120 of method 100.

Address request module 330 may be configured to detect an interruption of the downloading process (e.g., because at least one of the first destination address and the first cookie has expired), and then transmit a second request for a second destination address and a second cookie associated with the target file, based on the stored link address and the stored web address. In some embodiments, request module 331 of address request module 330 is configured to generate the second request by including the web address in the request header, which enables the server to verify the target file of which the downloading is to be resumed. In some embodiments, address request module 330 is configured to perform at least part of step S130 of method 100.

Download resumption module 340 may be configured to resume the downloading process of the target file using the second destination address and the second cookie. In some embodiments, download source switching module 341 is configured to switch the downloading process from using the previously-stored first destination address and the first cookie to using the second destination address and the second cookie. In some embodiments, download module 342 is configured to resume the downloading process using the second destination address and the second cookie, as instructed by download source switching module 341. In some embodiments, download module 342 is also configured to transmit a third request for the file data, and the third request can include attributes reflecting a size of the file that has not been downloaded. In some embodiments, download resumption module 340 is configured to perform at least part of step S140 of method 100.

According to embodiments of the present disclosure, after download request module 310 transmits a first request to a server to download a file, and receive first destination address associated with a download source for the file and a first cookie, the downloading process can start. Address data storage module 320 can store the received information including the first destination address, the first cookie, a link address associated with the file, and a web address associated with the link address. When the downloading process is interrupted, and that the first destination address and the first cookie have expired, address request module 330 can transmit a second request to the server for a second destination address and a second cookie, with the second request generated based on the stored link address and web address. The second destination address and the second cookie can then be provided to download resumption module 340 to resume the downloading process.

Figure 4:
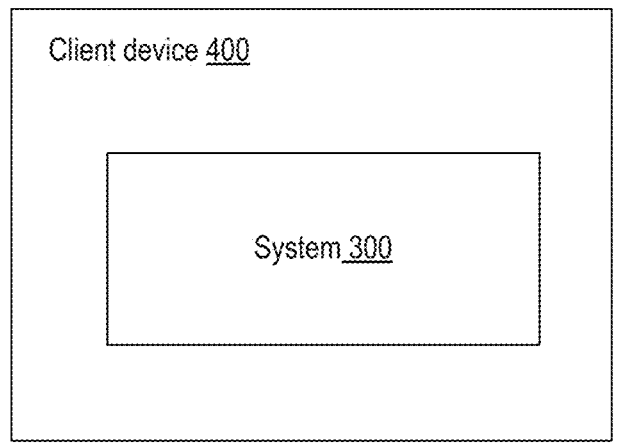
FIG. 4 is a schematic diagram illustrating a system for file downloading based on switching of a download source, consistent with some embodiments of the present disclosure.

FIG. 4 is a schematic diagram illustrating an exemplary client device 400 consistent with embodiments of the present disclosure. As shown in FIG. 4, client device 400 includes a system for file downloading, such as system 300 of FIG. 3.

With embodiments of the present disclosure, by switching the download source, a new destination address and a new cookie can be generated when there is a network service interruption or a suspension in the downloading process. The downloading process can then be resumed using the new destination address and the new cookie, thereby improving efficiency of network resource usage, and user experience.

As will be understood by those skilled in the art, embodiments of the present disclosure may be embodied as a method, a system or a computer program product. Accordingly, embodiments of the present disclosure may take the form of an entirely hardware embodiment, an entirely software embodiment or an embodiment combining software and hardware. Furthermore, embodiments of the present disclosure may take the form of a computer program product embodied in one or more computer available storage media (including but not limited to a magnetic disk memory, a CD-ROM, an optical memory and so on) containing computer available program codes.

Embodiments of the present disclosure are described with reference to flow diagrams and/or block diagrams of methods, devices (systems) and computer program products according to embodiments of the present disclosure. It will be understood that each flow and/or block of the flow diagrams and/or block diagrams, and combinations of flows and/or blocks in the flow diagrams and/or block diagrams, can be implemented by computer program instructions. These computer program instructions may be provided to a processor of a general-purpose computer, a special-purpose computer, an embedded processor, or other programmable data processing devices to produce a machine, such that the instructions, which are executed via the processor of the computer or other programmable data processing devices, create a means for implementing the functions specified in one or more flows in the flow diagrams and/or one or more blocks in the block diagrams.

These computer program instructions may also be stored in a computer readable memory that can direct a computer or other programmable data processing devices to function in a particular manner, such that the instructions stored in the computer readable memory produce a manufactured product including an instruction means which implements the functions specified in one or more flows in the flow diagrams and/or one or more blocks in the block diagrams.

These computer program instructions may also be loaded onto a computer or other programmable data processing devices to cause a series of operational steps to be performed on the computer or other programmable devices to produce processing implemented by the computer, such that the instructions which are executed on the computer or other programmable devices provide steps for implementing the functions specified in one or more flows in the flow diagrams and/or one or more blocks in the block diagrams.

In a typical configuration, a computer device includes one or more Central Processing Units (CPUs), an input/output interface, a network interface and a memory.

The memory may include forms of a volatile memory, a random access memory (RAM) and/or non-volatile memory and the like, such as a read-only memory (ROM) or a flash RAM in a computer readable medium. The memory is an example of the computer readable medium.

The computer readable medium includes non-volatile and volatile media, removable and non-removable media, wherein information storage can be implemented with any method or technology. Information may be modules of computer readable instructions, data structures and programs or other data. Examples of a computer storage medium include, but are not limited to, a phase-change random access memory (PRAM), a static random access memory (SRAM), a dynamic random access memory (DRAM), other types of random access memories (RAMs), a read-only memory (ROM), an electrically erasable programmable read-only memory (EEPROM), a flash memory or other memory technologies, a compact disc read-only memory (CD-ROM), a digital versatile disc (DVD) or other optical storage, a cassette tape, tape or disk storage or other magnetic storage devices or any other non-transmission media which may used to store information capable of being accessed by a computer device. According to the definition of the context, the computer readable medium does not include transitory media, such as modulated data signals and carrier waves.

It will be further noted that the terms "comprises", "comprising" or any other variations are intended to cover non-exclusive inclusions, so as to cause a process, method, commodity or device comprising a series of elements to not only comprise those elements, but also comprise other elements that are not listed specifically, or also comprise elements that are inherent in this process, method, commodity or device. Therefore, the element defined by a sentence "comprising a . . . " does not preclude the presence of other same elements in the process, method, commodity or device including said elements under the condition of no more limitations.

As will be understood by those skilled in the art, embodiments of the present disclosure may be embodied as a method, a system or a computer program product. Accordingly, embodiments of the present disclosure may take the form of an entirely hardware embodiment, an entirely software embodiment or an embodiment combining software and hardware. Furthermore, embodiments of the present disclosure may take the form of a computer program product embodied in one or more computer available storage media (including but not limited to a magnetic disk memory, a CD-ROM, an optical memory and so on) containing computer available program codes.

One of ordinary skill in the art will understand that the above described embodiments can be implemented by hardware, or software (program codes), or a combination of hardware and software. If implemented by software, it may be stored in the above-described computer-readable media. The software, when executed by the processor can perform the disclosed methods. The computing units and the other functional units described in this disclosure can be implemented by hardware, or software, or a combination of hardware and software. One of ordinary skill in the art will also understand that multiple ones of the above described modules/units may be combined as one module/unit, and each of the above described modules/units may be further divided into a plurality of sub-modules/sub-units.

Other embodiments of the present disclosure will be apparent to those skilled in the art from consideration of the specification disclosed here. This application is intended to cover any variations, uses, or adaptations of embodiments of the present disclosure following the general principles thereof and including such departures from the present disclosure as come within known or customary practice in the art. It is intended that the specification and examples be considered as exemplary only.

What is claimed is:

1. A method for file downloading, the method comprising:
transmitting a first request to a server to start a downloading process of a file;
receiving a first destination address and a first cookie for the downloading process,
wherein the first destination address and the first cookie are associated with the file;
storing the first destination address, the first cookie, a link address associated with the file, and a web address associated with the link address;
detecting an interruption of the downloading process;
responsive to detection of an interruption of the downloading process, transmitting a second request to the server for a second destination address and a second cookie based on the link address and web address, wherein the second destination address and the second cookie are associated with the file; and resuming the downloading process of the file using the second destination address and the second cookie.

2. The method of claim 1, wherein the detection of an interruption of the downloading process further comprises detecting that at least one of the first destination address and the first cookie is invalid.

3. The method of claim 1, wherein the detection of an interruption of the downloading process further comprises detecting that at least one of the first destination address and the first cookie has expired.

4. The method of claim 1, wherein the second request is generated based on the link address, and wherein a header of the second request includes the web address.

5. The method of claim 1, wherein the resumption of the downloading process of the file using the second destination address and the second cookie comprises resuming the downloading process based on a progress of the downloading process before the interruption occurs.

6. The method of claim 1, wherein the resumption of the downloading process of the file using the second destination address and the second cookie comprises transmitting a third request to download the file, wherein the third request includes an attribute that represents a size of the file that has not been downloaded when the interruption of the downloading process occurs.

7. The method of claim 6, wherein the third request is an HTTP (HyperText Transfer Protocol) request, and wherein the attribute is included in the range unit of the third request.

8. An apparatus for file downloading comprising:
a memory device that stores instructions and
at least one hardware processor configured to execute the instructions to:
  transmit a first request to a server to start a downloading process of a file;
  receive a first destination address and a first cookie for the downloading process, wherein the first destination address and the first cookie are associated with the file;
  store the first destination address, the first cookie, a link address associated with the file, and a web address associated with the link address;
  detect an interruption of the downloading process;
  responsive to detection of an interruption of the downloading process, transmit a second request to the server for a second destination address and a second cookie based on the link address and web address, wherein the second destination address and the second cookie are associated with the file; and
  resume the downloading process of the file using the second destination address and the second cookie.

9. The apparatus of claim 8, wherein the detection of an interruption of the downloading process further comprises the at least one hardware processor being configured to execute the instructions to detect that at least one of the first destination address and the first cookie is invalid.

10. The apparatus of claim 8, wherein the detection of an interruption of the downloading process further comprises the at least one hardware processor being configured to execute the instructions to detect that at least one of the first destination address and the first cookie has expired.

11. The apparatus of claim 8, wherein the second request is generated based on the link address, and wherein a header of the second request includes the web address.

12. The apparatus of claim 8, wherein the resumption of the downloading process of the file using the second destination address and/or the second cookie comprises resuming the downloading process based on a progress of the downloading process before the interruption occurs.

13. The apparatus of claim 8, wherein the resumption of the downloading process of the file using the second destination address and the second cookie comprises the at least one hardware processor being configured to execute the instructions to transmit a third request to download the file, wherein the third request includes an attribute that represents a size of the file that has not been downloaded when the interruption of the downloading process occurs.

14. The apparatus of claim 8, wherein the third request is an HTTP (HyperText Transfer Protocol) request, and wherein the attribute is included in the range unit of the third request.

15. A non-transitory readable medium that stores a program that, when executed by a processor, causes the processor to perform a method for file downloading, the method comprising:
  transmitting a first request to a server to start a downloading process of a file;
  receiving a first destination address and a first cookie for the downloading process, wherein the first destination address and the first cookie are associated with the file;
  storing the first destination address, the first cookie, a link address associated with the file, and a web address associated with the link address;
  detecting an interruption of the downloading process;
  responsive to detection of an interruption of the downloading process, transmitting a second request to the server for a second destination address and a second cookie based on the link address and web address, wherein the second destination address and the second cookie are associated with the file; and
  resuming the downloading process of the file using the second destination address and the second cookie.

16. The medium of claim 15, wherein the detection of an interruption of the downloading process further comprises detecting that at least one of the first destination address and the first cookie is invalid.

17. The medium of claim 15, wherein the detection of an interruption of the downloading process further comprises detecting that at least one of the first destination address and the first cookie has expired.

18. The medium of claim 15, wherein the second request is generated based on the link address, and wherein a header of the second request includes the web address.

19. The medium of claim 15, wherein the resumption of the downloading process of the file using the second destination address and the second cookie comprises resuming the downloading process based on a progress of the downloading process before the interruption occurs.

20. The medium of claim 15, wherein the resumption of the downloading process of the file using the second destination address and the second cookie comprises transmitting a third request to download the file, wherein the third request includes an attribute that represents a size of the file that has not been downloaded when the interruption of the downloading process occurs.

* * * * *